June 15, 1943. J. R. McDERMET 2,321,839
HEATING AND DEAERATING OF LIQUIDS
Filed March 20, 1941 4 Sheets-Sheet 1

INVENTOR
John R. McDermet
by Thomas S. Miller,
his attorney

June 15, 1943.  J. R. McDERMET  2,321,839
HEATING AND DEAERATING OF LIQUIDS
Filed March 20, 1941   4 Sheets-Sheet 2
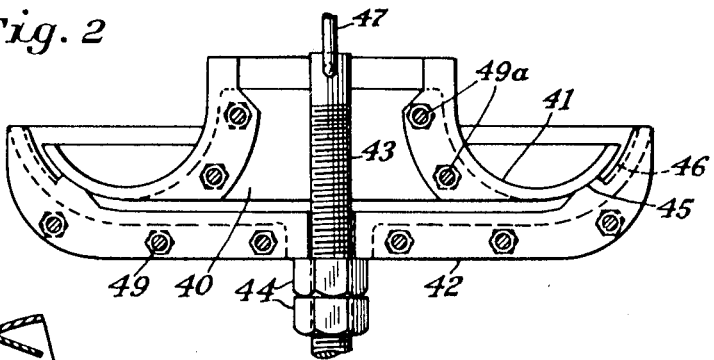
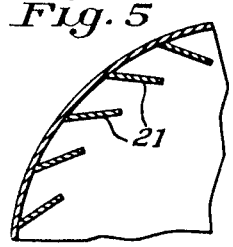
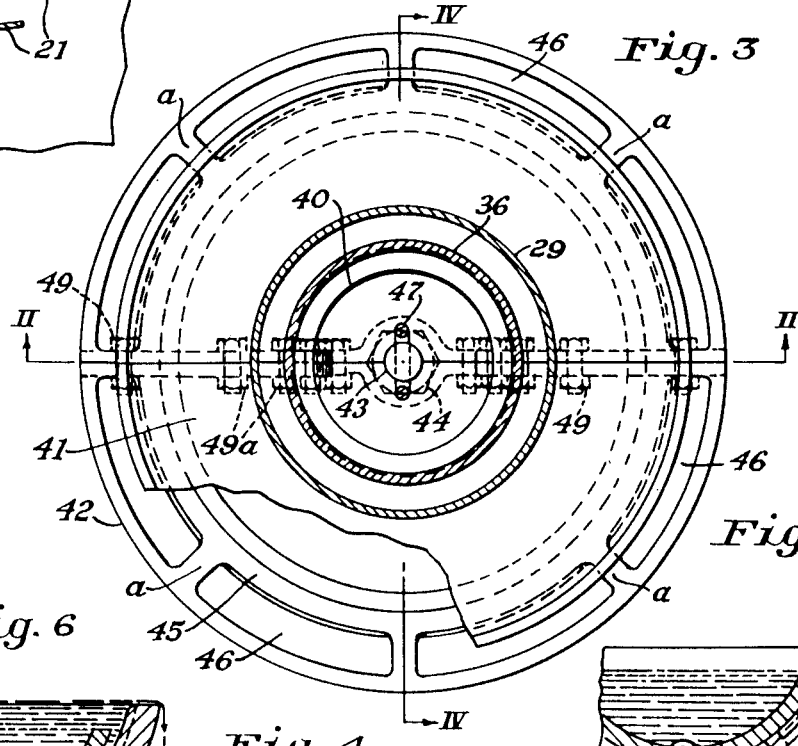
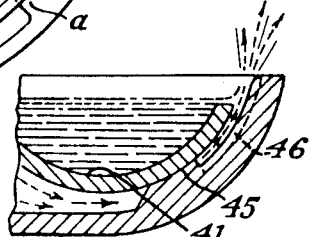
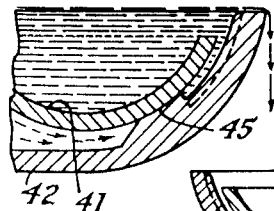
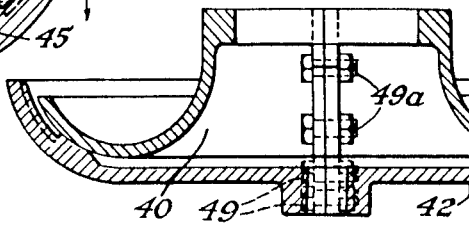
INVENTOR
John R. McDermet
by Thomas S. Miller
his attorney June 15, 1943. J. R. McDERMET 2,321,839
HEATING AND DEAERATING OF LIQUIDS
Filed March 20, 1941 4 Sheets-Sheet 4
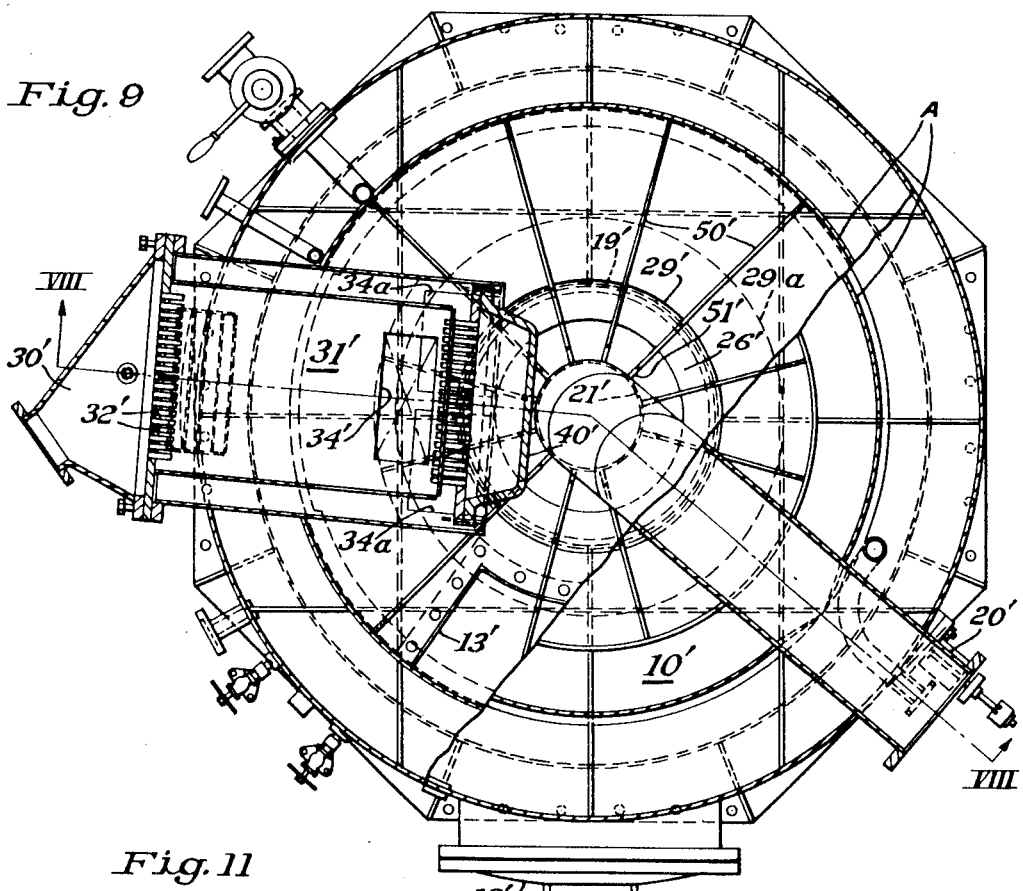
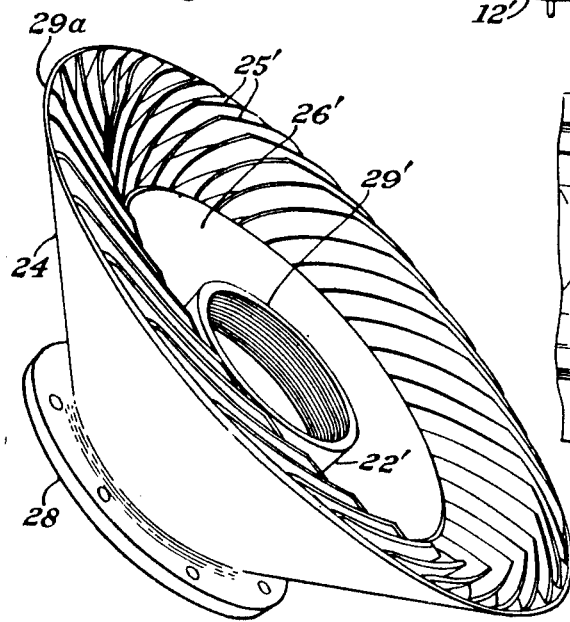
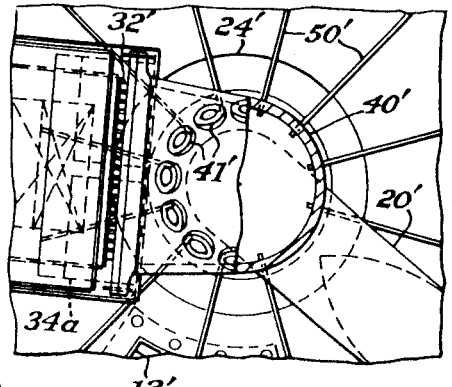
INVENTOR
John R. McDermet
by Thomas D. Miller
his attorney Patented June 15, 1943

2,321,839

UNITED STATES PATENT OFFICE 2,321,839

HEATING AND DEAERATING OF LIQUIDS

John R. McDermet, Hempfield Township, Westmoreland County, Pa., assignor to Elliott Company, Pittsburgh, Pa., a corporation of Pennsylvania Application March 20, 1941, Serial No. 384,307

2 Claims. (Cl. 261—78)

This invention pertains to heating and deaerating or degasifying of liquids, and more particularly, to procedure for purifying contaminated water such as feed water.

Subject matter of this application has been disclosed in my applications Serial No. 294,910, filed September 14, 1939, entitled "Deaeration apparatus" (now U. S. Patent 2,299,550 dated Oct. 20, 1942), and Serial No. 337,645. filed May 28, 1940, entitled "Deaeration of liquids."

The present invention has particular application to procedure and apparatus for deaeration where the apparatus is subjected to swaying and tilting, for example, to conditions such as encountered in marine work.

As will be appreciated, the ordinary form of deaerator becomes rather inefficient and ineffective when employed under conditions such as encountered in marine use. The apparatus should be capable of effectively operating even although subjected to constant tilting, tipping, or swaying action. Heretofore, the so-called marine types of deaerators have been rather inefficient from an economy standpoint. That is, in one construction, it was found necessary to atomize the feed water in order to obtain suitable deaeration; atomization was necessary to minimize so-called water hammer and other pounding actions adjacent the spray apparatus that are due, in part at least, to the action of steam upon the water being deaerated. Such a type of deaerator, in addition to utilizing or wasting enormous amounts of energy (particularly steam velocity energy) tends to increase the wear and corrosive action upon the inside portions of the apparatus involved.

In a unit employed for this purpose, it is customary to specify that it shall be effective from 3% of its rated power to 110% of its nominal rated capacity. A vessel may be called upon to operate for about 25% of its life at normal rated capacity, 3% at overloads, and 72% of the period at minimum loads. Thus, the deaerators should effectively and efficiently operate over the entire range.

If steam velocity is alone relied upon to effect spraying, and the velocity is created through a throttling valve, as has heretofore been customary, it is apparent that a great deal of automatic adjustment is required for this extreme range of operation to provide the variable quantities of steam. In addition, the temperature levels from which the water is initially heated are extremely variable due to temperature conditions of the particular body of water in which the ship is cruising.

For example, a typical installation provides a variable steam orifice through which varying quantities of the fluid required for different rates of operation are passed. This variable orifice is part of a pressure loaded valve that is automatically adjusted to maintain a constant pressure drop at a substantially constant velocity for the issuing steam. It is apparent that the throttling action and pressure drop involve a material decrease in temperature of the steam. In addition, the operating parts are exposed to heavy reactions and to hydraulic water hammer upon its members, due in part to the varying orifice. Consideration must then be given to increasing the weight of the operating parts so that they will be able to withstand the shock loads.

In view of the above considerations, it has been an object of my invention to provide new and improved procedure and apparatus for effectively deaerating feed water under unfavorable conditions, such as encountered in marine operation.

Another object of my invention has been to develop an improved procedure and apparatus employing, in general, efficient operating characteristics of a counter-flow induction type of heater such as set forth in my Patent No. 1,742,998, entitled "Method and apparatus for treating liquids," showing an apparatus suitable for a relatively stationary installation.

A further object of my invention has been to provide an efficient and practical form of deaerating apparatus that will be operative over a wide range of load variations.

A still further object has been to devise a system for liquid deaeration that will eliminate the disadvantageous features heretofore inherent in apparatus of the marine type and that will have an economy and effectiveness of action.

These and many other objects of my invention will be apparent to those skilled in the art from the drawings, the description, and the appended claims.

In the drawings:

Figure 2 is an enlarged detailed view in elevation of a valve mechanism taken along the line II—II of Figure 3;

Figure 3 is an enlarged top plan view taken along the line III—III of Figure 1;

Figure 4 is an enlarged vertical sectional view taken on the line IV—IV of Figure 3;

Figure 5 is a top fragmental section detail taken through deflecting vanes 21 of Figure 1;

Figures 6 and 7 are enlarged vertical sectional details showing somewhat diagrammatically the operation of the arrangement of Figure 4 under different load conditions;

Figure 9 is a top plan view in section taken along the line IX—IX of Figure 1;

Figure 10 is a broken top plan section taken along the line X—X of Figure 1; and Figure 11 is a side view in perspective showing a detail of the apparatus shown in Figures 8 and 9.

Figure 1:
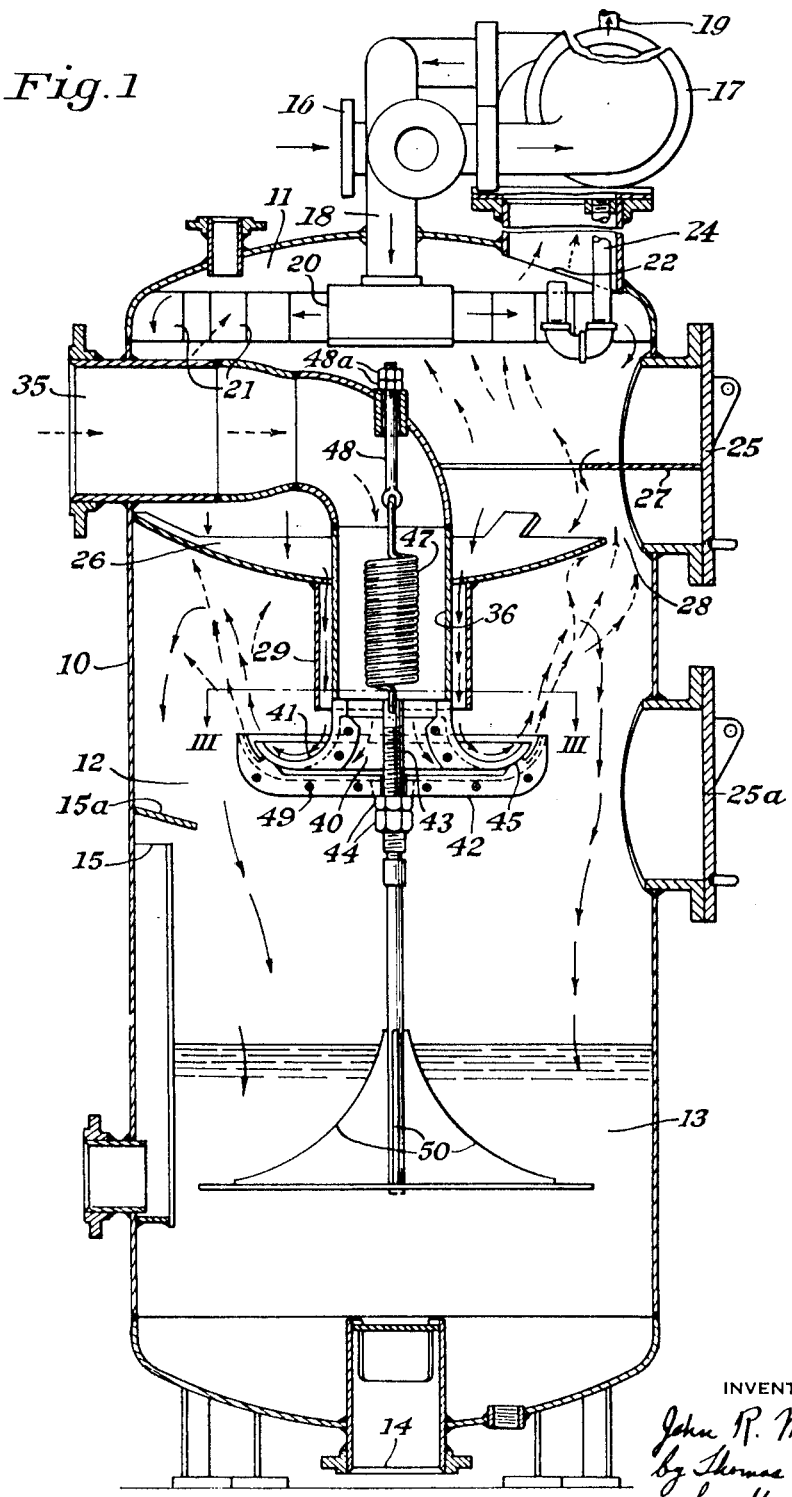
Figure 1 is a vertical view in elevation showing a section through a deaerator unit constructed in accordance with the principles of my invention.

In the embodiment of my invention shown in Figures 1-7, inclusive, I will designate the apparatus by ordinary numerals, and in the embodiment shown in Figures 8-11, inclusive, I will show the apparatus by numerals having prime suffixes.

In the embodiment of my invention shown for the purpose of illustration, 10 represents a unit having an upper, preliminary, induction heating, and partially deaerating chamber 11, and a lower or final, thoroughfare heating, and deaeration stge or chamber 12. The bottom portion of the chmber 12 has a storage space for the purified water 13, which is removed through an outlet 14. I have also shown a skimmer type of overflow 15 that does not constitute a part of the present invention; a baffle 15a is positioned to prevent the purified water from falling into the opening 15.

Feed water to be deaerated enters inlet conduit 16 adjacent the top of the apparatus and passes through the tubes of a conventional type of vented-condenser 17, leaving the condenser and entering the upper deaeration chamber 11 through a conduit 18. The water, before actually entering chamber 11, passes through spray nozzle unit 20 that directs the water outwardly in a plurality of vortex-like stream flows (thin vertical sheets) from the unit or substantial center of the chamber. In this manner the water is broken up into spray paths and moves about the upper portions of the chamber in somewhat circular or rotating paths within the confines of the wall portions thereof. A suitable type of spray apparatus has been fully described in my Patent No. 2,012,454, entitled "Spray device." It will be apparent to those skilled in the art that any suitable form of spray device for throwing water outwardly and about the upper portion of the chamber 11 may be employed. Deflecting vanes or baffles 21 are attached at a tangent to the shell 10 and extend inwardly from peripheral portions of chamber 11 in the path of the spray from unit 12 to aid in breaking up the flow and in diverting it inwardly back into steam space 11.

The water thus sprayed is collected by a substantially centrally-positioned and upwardly and outwardly-extending cup-shaped baffle plate 26. Additional baffle means 27 extends peripherally inwardly from and about chamber 11 and above the baffle portion 26 in such a manner that the broken-up or sprayed portions of water falling from the upper portion of chamber 11 will be prevented from dropping through the space 28 between outer edges of the cup-shaped collecting baffle 26 and inner wall portions of chamber 11.

The water thus collected or received moves along the inclined surface of the cup-shaped baffle 26 to a substantially centrally-located vertical-annulus-shaped shell element 29 that projects vertically downwardly from chamber 11 into the lower chamber 12.

Steam is introduced into the unit 10 through an inlet 35 which enters laterally through and extends along the upper chamber 11, converges along its length, and terminates in a substantially vertically-depending portion 36. The portion 36 extends substantially concentrically within and in a spaced relationship with respect to the sleeve-like annulus element 29, thus providing a flow path for the partially heated and deaerated water entering the lower chamber 12 from the upper chamber 11. Steam entering through conduit 35, flows downwardly into the hollow interior or chamber of a distribution valve 40.

The distribution valve 40 has an outwardly-extending and upwardly-curved substantially symmetrically-shaped guide member 41 that may be formed or cast in two parts and secured together by suitable means, such as bolts 49a; entering water is directed downwardly along such guide from the annulus 29. A lower member or movable valve element 42 is removably and adjustably mounted on a vertically-extending support shaft 43 by means of a lock nut construction 44. As shown particularly in Figures 2, 3, and 4, the movable valve plate 42 may comprise a two-part casting suitably secured together by bolt means 49; it has annularly extending and substantially spherically-shaped valve seats 45 that contact under portions of the guide 41 at positions adjacent outer-edge portions of the elements 41 and 42; the seats 45 are spaced inwardly a short distance therefrom to provide a peripherally-extending orifice or annulus-like chamber portion 46.

The movable valve element 42 is preferably dampened; for this purpose, I have shown a removable extension to the shaft 43 that is provided with outwardly-extending fin-like damper portions 50 that are adapted to project into the liquid space 13 of the lower chamber 12. The shaft 43 and the movable portion 42 are resiliently and somewhat loosely-positioned with respect to the guide portion 41 by means of a vertically-extending spring 47 that is removably connected by a shaft 48 and by removable bolt means 48a to extend from an inner portion of the conduit 35. It will be noted that the substantially complementary shape relation between guide 41 and movable (spring-loaded) valve head 42 is such that they are held in a desired relationship, although substantially loosely-positioned. Cleaning doors 25 and 25a are respectively provided for the upper and lower chambers 11 and 12.

The vent condenser 17 has, as shown, a large opening 22 through which the steam and non-condensible gases enter, and a vent opening 19 for exhausting the non-condensible gases. Condensate from the condenser 17 returns to the upper chamber 11 of the heater through a liquid-sealed overflow pipe 24. As a result, the returning condensate, being in the up-flow path to the condenser inlet 22, is subjected to preliminary heating and deaeration before it enters chamber 11.

In the operation, it is believed that I have developed a number of new and improved features. As previously pointed out, the incoming feed water to be deaerated, is first subjected to a preliminary heating treatment in vent condenser 17 and then enters chamber 11 to be sprayed outwardly and about substantially the full area thereof, in order to receive heat from the steam entering from the lower chamber or compartment 12 through space or opening 28, and thus, to become heated and partially deaerated thereby. The location of steam inlet 35 is such that heat normally lost by conduction from conduit 35 is imparted to the water in the upper chamber 11 to further increase and improve the heating and deaerating action therein. The steam entering from the lower chamber, by reasons of pressure differentials existing between the upper and lower chambers, thus moves counter to the downward flow of water in chamber 11, imparting heat to the water and condensing a portion of such steam. The uncondensed portions of steam and the non-condensible gases enter condenser 17, as previously explained, through a large inlet 22. The condensed steam portions again enter chamber 11 through liquid-sealed inlet 24.

The thus-effectively heated and very thoroughly partially deaerated water falls downwardly along the passage provided between steam conduit 36 and the annulus-like shell 29. There is little frictional loss and thus the water attains a velocity that substantially corresponds to the velocity of the fall that it would attain by falling through the same vertical distance in free space. The outwardly and concavely curved guide 41 utilizes such gravity acceleration of the water to direct it in a smooth and substantially uninterrupted path radially outwardly from the center of the lower chamber 12 in a continuous sheet-like stream during conditions of normal or heavy load. Steam issues from the chamber of valve 40 in proportion to demand requirements, that is, depending upon the amount of water and deaeration to be accomplished. The steam moves past valve seat 45, at which time it has some velocity and a relatively thin thickness, to the orifice portion or opening 46 where it has little velocity and a greater thickness. It will be noted that the water and steam are directed in substantially parallel paths, and that they will thus contact somewhere, during normal load conditions, in the space beyond the valve member and the wall portions of the chamber 12. That is, the water has an upward and radial component by reason of the shape of guide 41, and thus, due in part, at least, to its greater density and lesser velocity, tends to fall in space upon the steam curtain that, as previously explained, emerges at moderate velocity from the annulus chamber 46. The water thereafter assumes a droplet, slug, or random form and its deaeration is thereby completed. At the time of contact, the water and steam are at substantially the same temperature due to the high effectiveness of the heating action in the chamber 11 and also, to some extent, due to the fact that water flows downwardly through a space that surrounds the steam inlet conduit 36. Conduction, radiation, and convection of heat from the steam thus further heat the water in its fall and later projection.

It will be appreciated that due to the control of the direction and flow of the water and steam, the low velocity of steam flow, and the fact that the steam and water meet in a substantially parallel relationship, etc., I have obtained a new high efficiency of deaerating action without the heretofore inherent problems and difficulties involved in the atomization of the water by the deaerating steam. By providing inlet and outlet temperatures that do not vary, the water and steam are maintained in substantially constant ratio; the steam is supplied in automatically varying quantities, depending upon or in proportion to variations in the load and/or in the water introduced. By directing a water curtain and a steam curtain in substantially-parallel but eventually-converging paths, a high velocity-flow of steam is unnecessary and water-reaction pounding and vibration have been eliminated.

It will be appreciated that water is inelastic and is difficult to accelerate to high velocity due to inertia reaction corresponding to the amount of energy added thereto by the steam. This produces a rattling noise and necessitates atomization in the prior art constructions to avoid heavy bumps in the valve mechanism. The present apparatus, at high load conditions, where quantities and reactions are important, obtains a low velocity contact in such a manner that the reaction is at a minimum and is, in effect, space-insulated from the operating parts of the unit; the water and steam are intimately mixed and the former is scattered in droplet-form throughout the space 12. The structure is effectively practical in the operation under heavy, as well as normal and low loads. There is no so-called injector action in the valve device, in that in the lower chamber 12, no condensation occurs at the point of mixture. The energy for a steam curtain is suitably provided by less than one pound of steam expansion through the valve seat 45; from an energy standpoint, such a low pressure is of little consequence, and thus, must be utilized with high effectiveness.

As previously pointed out, the curved shape of the guide member 41 deflects the water outwardly and upwardly in order to utilize its velocity due to gravity acceleration in passing along the annulus 29. As no reversal of direction such as employed in atomization is required, the energy requirements are insignificant and the steam energy is utilized for water dissipation as effectively as possible without objectionable reaction effects upon the mechanical portions of the construction. The water, in passing outwardly, increasingly diffuses, and on contacting the steam, there is water dissipation due to its method of distribution prior to contact. Thus the energy requirements for spraying are additionally reduced.

It will be noted that the outer extremities of the guide portion 41 of the valve are slightly shorter than the outer edge extremities of movable or spring-loaded portion 42. This, in combination with orifices 46, is significant in obtaining an effective and efficient operation of a device under low load conditions. At a very low load, say less than 5%, there may not be enough water to form the curved water curtain nor enough steam to form the steam curtain. Water then descends through the annulus 29 and forms a pool in the concavity of guide disk 41 and over the opening to the orifice 46. When the cavity is full, the water flows over into the annulus space 46 at one or more points of the periphery and the steam admitted in accordance with the demands merely bubbles through the water in the orifice 46 to obtain what may be termed a scrubbing action. Thus, during low load conditions, the water merely bubbles over the edge of the inner valve disk 41 and falls over the edge of the outer valve disk 42. As the load increases, the steam thickness and velocity will become sufficient to hurl the water out of the orifice in slugs or droplets. Of course, at the same time, the quantity of the water will increase and thus there is more energy of outward flow. In the transition stage from the low (see Figure 6) to normal load (see Figure 7) conditions, a portion of the water may be prevented from entering orifice 46 by an upward movement of the steam. As previously pointed out, the steam entering the chamber of valve 40, emerges past valve seats 45 with a moderate velocity and immediately expands into the annular space 46 and emerges therefrom with a lesser velocity and a greater thickness.

The above operation thus provides a highly efficient action regardless of the load conditions. It will also be noted that the major portion of the steam rising from the lower or final deaeration chamber 12 moves upwardly from space 28 between baffles 26—27. Thus, the steam can be effectively employed to preheat the water flowing downwardly along the vertical annulus 29 through the walls thereof by conduction, without interfering with the gravity acceleration of such water flow as would be the case if the steam flowed upwardly along the inside of the annulus 29. The partially contaminated steam is prevented from contaminating the water in the lower or deaeration stage.

In Figure 1, for the purpose of showing and clearly disclosing the operation of the device under normal load conditions, I have indicated water flow by solid arrowed lines and steam flow by dotted arrowed lines.

I preferably provide the steam with enough velocity as it leaves the valve that it will carry past points where it might enter the space 29—36; however, the shape and arrangement of the valve and associated parts are also such that the counterflow will be through the space 28.

Figure 8:
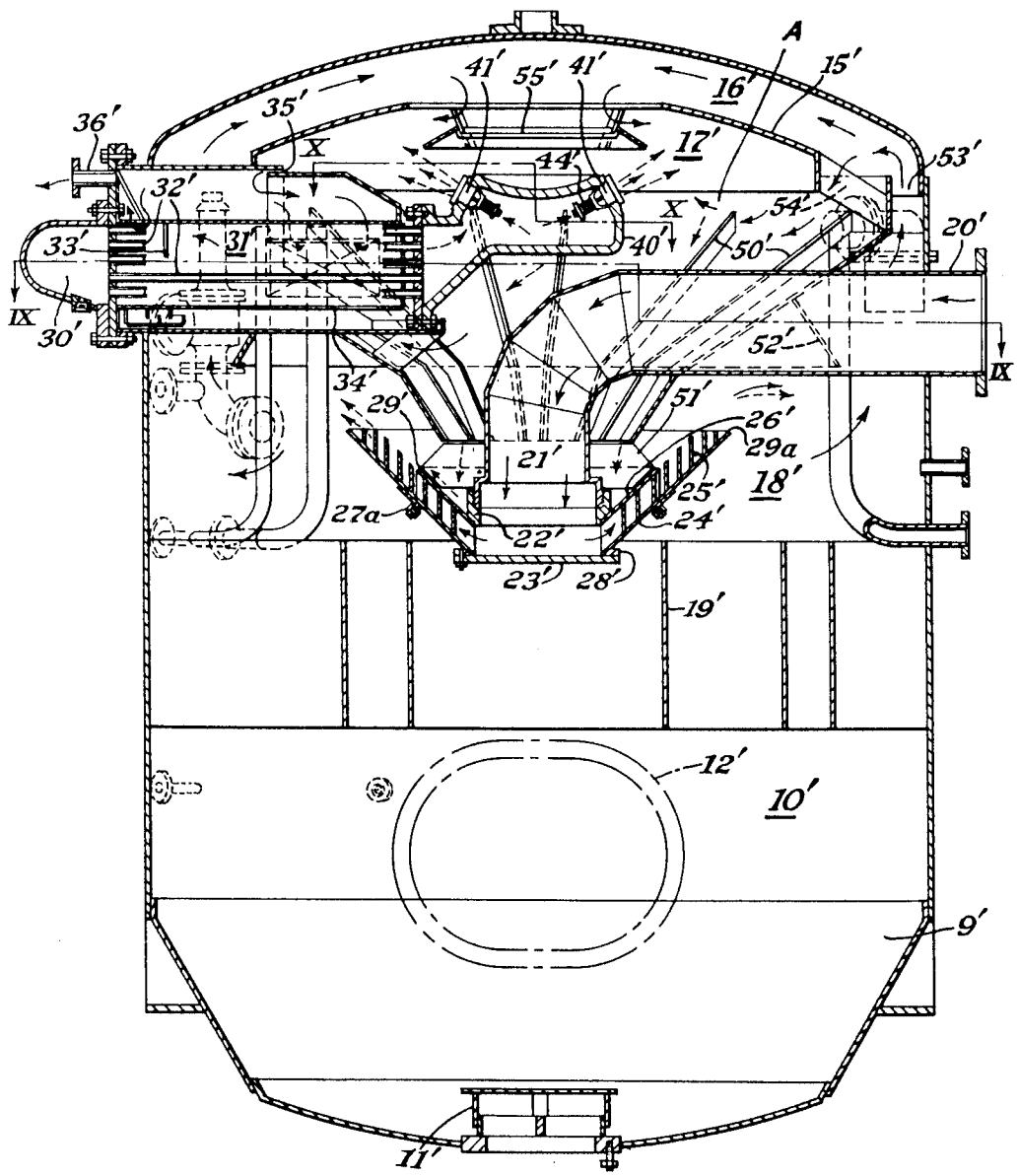
Figure 8 is a vertical sectional view in elevation of a modified deaerating unit or apparatus employing my invention and taken along the line VIII—VIII of Figure 9.

In the second embodiment of my invention as particularly shown in Figures 8 and 9, a deaerating apparatus constructed in accordance with my invention has been designated generally by the numeral 10'. This unit comprises shell-like wall portions of suitable metal provided with inspection openings such as 12' and 13' and having a hooded outlet 11' for the deaerated liquid 9' that is collected in the bottom portion of its lower or final deaeration chamber 18'.

The unit 10' also has an upper or preliminary heating and deaeration chamber 17' and an auxiliary or supplementary chamber 16' separated therefrom by a wall portion 15' that provides an annular space along the upper or top portions of the casing or shell for steam travel.

Steam is introduced into the unit 10' through an inlet pipe or conduit 20'. This pipe, in effect, enters the unit 10' substantially midway between the upper and lower chamber portions 17' and 18' and turns downwardly substantially centrally of the space at 21' to deliver steam into the lower chamber 18'. The delivery of this steam will be later described.

Contaminated water or the liquid to be deaerated is introduced into the unit 10' through a condenser inlet chamber 30'. The condenser 31' is of a suitable surface type having water tubes 32' extending lengthwise thereof and delivering partially heated water into a centrally disposed liquid supply chest 40'. The chest 40' like the pipe 20' has a heat exchange relation with the fluids in the chamber into which it projects. It will be apparent that the condenser 31' in extending into the upper deaeration chamber also has a heat exchange relationship with the fluids in such chamber. Thus, the water may be further heated in the chest 40' before it is sprayed outwardly through spray elements 41'. As shown, the chest 40' has a series of outwardly and upwardly directed spray elements or nozzles 41'. In the apparatus disclosed, twelve of these nozzles 41' have been mounted about a centrally-located peripheral portion of the chest 40' to spray water into the upper chamber in the form of a series of individual conical sprays that are uniformly distributed to provide in combination a conically-shaped spray. The water thus introduced mixes with at least partially contaminated steam, causing it to condense.

The liquid spray into the upper deaeration chamber 17' is effected in such a manner that the condensing steam heats the water to substantially steam temperature. The heated and partially deaerated water and condensed steam fall from the upper heating chamber 17 between baffle plate members 51' in the lower deaeration chamber 18'. The members 51' permit the water to fall upon an inside, conical-face, guide member 26', down and along which it will run until a pool is formed between it and the outside wall of the portion 21' of the steam inlet tube. As shown in Figures 8 and 9, members 51' are mounted on and set within the conic guide member 26' and, in effect, provide a continuation of upper baffles 50'; they provide a substantially uniform distribution of the water and prevent surging and splashing in the basin formed by the conic guide member 26'. It will thus be apparent that the water is directed radially outwardly in segregated flow paths and then downwardly towards the segregated flow paths of the steam. The arrangement is such that the water is directed under both low and high load conditions substantially uniformly and continuously about the steam passage means 25'. It will also be noted that the arrangement of the vanes 25' is such that the steam will, in effect, move outwardly in a vortex-like path.

It will be noted that the water thus collected is in a heat exchange relationship with the steam entering through the inlet 21'. The water then spills or falls over an annular edge or circular lip portion 29' of the inside guide member 26' upon an outer guide member 24'. Steam flows downwardly along the member 21' and then upwardly between the outside of the member 26' and the inside of the outer conical guide member 24' that is spaced from the member 26'. A plurality of spiral-like vanes 25' are positioned or extend upwardly from the inner periphery of the outer conical guide member 24' and, in effect, provide a series of outwardly running spaces or passages for the steam which enters the spacing between the lower portions of the members 24' and 26'.

Due to the conical shape of the outer guide member 24', I change the radius of curvature from point to point in order to provide substantially parallel vanes within the space limitations involved. That is, the spacing between the vanes 25' will tend to increase in size or diverge outwardly. The bounding surfaces between the vanes are thus substantially parallel conical envelopes, see particularly Figure 11. The vanes 25' traverse peripherally around the envelope and rise upwardly. The guided flow passages between vanes provide a force component directing the flow peripherally therethrough, while at the same time it exerts an upward lifting force against gravity. In this manner, I provide a longitudinal path of flow travel within a limited space to give maximum mixing and deaeration action between the steam and the liquid. I have successfully used vanes with angles of between 90 and 150°, this being the included angle between their exit and their inlet edges measured on the plan view. This may be measured by placing the mixing device so that its steam passage portion 22' extends vertically from a horizontal plane and then projecting a point from the entry and exit ends of a given passage and connecting each point with a radial line drawn from the vertical axis. The included angle between these two radial lines is the angle referred to herein. The choice of the angle is determined by the maximum value that can be secured without unduly congesting the passages; and, from a practical standpoint, the angle between the inlet and the outlet edges is made as large as conditions will permit.

In operation, the steam enters through the central steam pipe 21' and is conducted to the inlet edges of the vanes 25'. It then flows peripherally outwardly and upwardly towards the discharge end or lip 29a.

The water that is brought down from the heating compartment 17' between spaced-apart baffles 51' to the storage pool provided by 26', falls over the annular or circular edge 29'; and, under low or medium load conditions it flows counter and downwardly and substantially parallelly to the upward flow of substantially pure steam along the spiral vane passages between guides 24' and 26'.

I have designated the path of the water by broken or dotted arrows and the path of the steam by solid arrows. It will be noted that partially contaminated steam in the lower or final deaeration chamber 18' passes upwardly through annular openings 53' into an upper heating compartment 16' formed by wall portions 15', entering through opening 53'. It then flows along two paths, the lesser portion following the space 16' upwardly, and a greater portion following the opening 54' downwardly into the chamber 17'. The portions of steam flowing in the chamber 16' are, as noted, in heat exchange relationship with the chamber 17' and flow downwardly and outwardly along peripheral side portions of a central baffle member 55' to directly mix with and preheat the water being sprayed into chamber 17'. Substantially all of the steam is condensed by the water sprayed through the nozzles 41'.

The non-condensible gases and a small portion of the steam enter the condenser 31' through inlets 34' and 35' and are directed by baffles to flow parallel to the tubes 32'. The condenser suitably vents the condensed steam into the unit 10' through openings 34a in its bottom shell (see Figure 10) and vents the gases through an outlet 36'. After entering the condenser 31' at the two inlets, the steam passes lengthwise along the tubes and around the baffle arrangement. The particular arrangement is especially adapted to disengage gases and vapors from the liquid to permit drainage of the vent condenser and to avoid carrying liquid into it. That is, the openings such as 34' and 35' are so located as to minimize the entry of portions of the water being deaerated. This is occasioned by the fact that the condenser is located in a region of heavy water spray.

The construction of the water spray nozzles 41' is shown particularly in Figures 8 and 10 of the drawings; the nozzle 41' is shown in an "open" position in these figures. These valves are normally open. As shown, these nozzles are what may be termed a poppet valve type having holding springs 44' about removable valve stems, and valve heads which seat upon outwardly-diverging conical portions of a Venturi-shaped inner wall portion, see my copending application Serial No. 337,645. The arrangement is such that water is sprayed outwardly in a conical sheet under a velocity head. The valve head moves within the Venturi-type throat according to the amount of opening desired, and is highly stable in operation; a pressure head of water is changed into a velocity head and accelerated; and, the transfer from the inner portion of the nozzle to the outer portion is accomplished without appreciable destruction of velocity. In other words, the water is changed from a pressure head to a velocity component without a substantial recovery of pressure and is discharged into the space 17' at a point of maximum velocity, so that the upstream pressure side of the valve produces a maximum velocity.

This arrangement produces a very stable type of operation and there is no evidence of valve chatter. The valve 41' distributes the water uniformly and is entirely free from vibration and chatter. It, in effect, floats between the liquid and is balanced between the cone formed by inner and outer or upstream and downstream velocity streams. The shape of the Venturi throat and the valve head is such that the conical spray form is maintained for light as well as heavy loads. The steam penetrates into the interior of the hollow conical water spray, and thus, there is a maximum mixing, since it also contacts exterior portions of the conical water spray. This is insured by cutting off a section of the conical water sprays with a baffle 15', and through this cut-off area, feeding the stream to the interior, relying upon the velocity of the water to carry non-condensible gases to the end of the projection path where complete turbulence exists. It also reinforces the construction.

Surge plates or break-up ribs 50' are incorporated in the inside of the tank by a conic-shaped separator member A and surround the steam valve or the steam entrance. They serve to break up the wave action of the water due to rolling and pitching of the ship. The arrangement protects the apparatus and its parts from the continuous slap of the waves on its interior. The member A separates chamber 17' from chamber 18'.

As previously pointed out, one of the problems has been to devise a steam supply apparatus or agency which will be effective at minimum loads of 3% of capacity as well as at loads above normal capacity. The present arrangement effects this result without any loaded valve or steam adjustment orifice mechanism. The operation of the present arrangement may be divided into three cycles or phases: In the first place, at low loads such as at 3% of rated capacity, water is delivered over the water admission lip 26' into the passages between vanes 25' in such a manner that the water distribution is regulated without being affected by the pitch and roll of the vessel. The areas are so proportioned that the water can run downhill through or between the vane channels and in so doing it continually comes into areas of less cross-section as it is proceeding radially inwardly. Eventually it will come into an area where the steam flow is sufficiently rapid to prevent further downward movement. At this stage of the operation, the steam nozzle unit or apparatus has a pulsating effect as the water is driven uphill by trapped steam and over lip 29a. The trapped condition is automatically relieved and the water runs back, and as sufficient water is continuously being added, the condition will be arrived at where a quantity is thrown out equal to the quantity being admitted. However, the portions admitted first go through a turbulent treatment before they can leave. In other words, they are subjected to a cycle of pulsations before they are distributed by the steam. As a result, there is a continual bubbling and reboiling in the vane passages and the water is scrubbed with steam and given a maximum deaeration within a limited time by the steam.

In actual operation, as observed through glass windows in the exterior of the shell, water is ejected with a pulsating effect that is visible to the eye; these pulsations are sufficiently rapid and small in magnitude that there is no noise and no measurable fluctuation in pressure upon sensitive gauges. Thus, at this condition of low load, the device is a scrubbing device which is adapted to alter its scheme of operation under higher loads at a point that it automatically selects without any moving parts and without any adjustment whatsoever.

It is apparent that as the load increases, the quantity of steam must be increased in proportion to the increase of water. Therefore, as demand increases, more water is required and more water will be delivered over the lip 26' and more steam will come through the vane passages. In the second phase or stage of operation, the water does not penetrate downwardly into the vane passages below the member 26' but is delivered by a simple flow process upon a curtain of steam to which relative rotation has been imparted by the spiral shape of the vane structure. Again, the conic section comes into utilization as the velocities during this stage are not sufficient to lift the water up against the force of gravity to enable it to clear the elevated discharge edge 29a of the nozzle. However, the steam is supplied in sufficient quantity to provide a measurable kinetic energy and not only has a rotating motion, itself, but is able to impart a rotary motion to the water. The result is that the water is driven up along the inner face or periphery of the cone 24', and between vanes 25' with a rotary motion as a whirling spray of moderate velocity sufficient to disintegrate the water into finely divided portions due to the component of the whirling action. During this cycle, the water is given a whirling motion, mixed with steam, and is scrubbed between the lips 29' and 29a upon the inner periphery of the outer or lower conical guide 24'. In this second stage of operation, the device produces a whirling spray, propelled by the steam, and guided and rotated by the vanes.

In the third phase, if the water quantities to be handled are still further increased, the steam must likewise increase further and will be emitted from the vane passages below the lip 26' with greatly increased velocity such that there is a pressure loss and a significant acquired velocity. The larger quantity of water passing over the lip 29' encounters a whirling curtain of steam having a very forceful velocity component; the water is thus not able to penetrate into the vane passages below the member 26'. The tendency is for the steam to rise out of the vane passages and propel the water upwardly substantially vertically as well as within the vane passages. In this operation, the water initially moves substantially parallel and in the same direction as the steam.

The spray conditions are extremely chaotic, some of the water, as above explained, being hurled upwardly to subsequently fall back into the steam curtain, some of it being hurled out along the inner passages of the outer guide envelope 24, as in the second phase of the operation. Significantly, there is now plenty of energy to spray the water and there is no difficulty in obtaining effective deaerating and mixing of the water with the steam as it is hurled at random and cannot fall into storage without becoming further entrained with steam curtains emerging from the nozzle. The pattern of distribution of the spray is such that it now has a greater density per cubic foot, a projection upwardly against gravity, and a tendency to fill a much larger liberation space in the interior of 18' than under the first two phases of operation. As a result, the disintegration of the larger quantity of water is effectively completed. The steam guide or nozzle has utilized automatically more available space for water-steam liberation and has added to the effectiveness of the water-steam separation therebeyond. The arrangement provides all the advantages of the variable-controlled orifice for steam distribution without the complication of moving parts and without other disadvantageous features that are inherent in such an arrangement. Furthermore, it provides a new and improved efficiency of action under variable load conditions, particularly from a time-space standpoint, which has never been approached by any apparatus heretofore. Due to its effective utilization of whirls, even at maximum load, the nozzle apparatus operates with less pressure drop than the nozzles of the variable orifice type. This is particularly significant since there is no loss of heat head under heavy load conditions due to throttling losses. It also is highly efficient at low loads which, as previously pointed out, constitute the greater portion of the effective life of a ship's operation. The apparatus brings the liquid containing dissolved gases into solubility equilibrium with an atmosphere free of such gases within a minimum time period.

As shown in Figure 11, the steam and water mixer unit may be formed as a unit, for example, by casting, and then mounted by threading its center ring 22' upon the steam inlet pipe portion 21'.

As will be apparent from the previous description, the vanes 25' extend in a curvilinear radial path along inner face portions of the outer guide member 24' to, in combination with the inner guide member 26', provide an arrangement that will heat and deaerate water under a wide range of load conditions without varying the area of the flow passages or throat portions of the orifice or orifices provided for the issuance of the steam. As a result, the applicant has been the first to eliminate a loaded steam valve and the need for controlling the velocity of flow in accordance with load conditions. It will be apparent that with an increase in quantity of water to be deaerated, the amount of steam produced will be increased; the present arrangement, see for example, Figure 8, does not require a valve means for varying the issuance of the steam into the lower deaeration chamber. As touched upon before, under low load conditions the flow of water is downwardly along the passages between the vanes 25' and in a counterflow direction to that of the steam to effect a pulsating and scrubbing action upon the small quantities of water within the curvilinear spiral flow passages; on the other hand, when the load is increased to a heavier value, the steam and water flow in substantially unidirectional paths, these steam and water paths having the same direction of flow. The present arrangement eliminates the loss of heat and pressure particularly under high heavier load conditions that is the normal accompaniment of throttling losses of a loaded steam valve.

It will be apparent from the above description of the embodiment of my invention shown particularly in Figures 1, 3, and 4, that mixing or auxiliary chambers 46 above the valve seat 45 are segregated and confined by radially-extending portions *a*, see particularly Figure 3, that limit movement of the water about the device when it is tilted during operation. This, in effect, provides a substantially constant pressure gradient at the point of issuance of the steam. The valve seat or ledge 45 also, in effect, acts as a collecting ledge for the water in the portions 46.

In the embodiment of my invention shown in Figures 8–11, inclusive, the water is, in effect, both collected and limited in its movement about the outer cone 24' by the spiral vanes 25'. These vanes also confine the water and steam in segregated flow paths in such a manner that the mixing device will automatically change from low to medium to high load operation without any mechanically moving parts.

It will be apparent that in the case of both embodiments, the steam in entering the deaeration chamber will bubble through the collected water to produce a pulsating action which increases in intensity with a slight increase in load. As the load becomes greater and the amount of steam and water increases, the water will have little if any opportunity to enter the mixing chamber and will have a substantially parallel flow with respect to the steam as against a counter flow under lower load conditions. Also under higher load conditions, the water will be substantially sprayed outwardly into and about the deaeration chamber. The mixing apparatus arrangement of each embodiment automatically provides an effective area of deaerating and heating action that increases with an increase of load.

Heretofore, prior to the present invention, those skilled in the art have been troubled with variable pressure gradients due to the tilting of the apparatus, and thus, of the mixing chamber, as the water will tend to move about the mixing apparatus towards the lowest point with the result that steam will issue from the highest point with little or no deaerating action. The means *a* of the first-mentioned embodiment of my invention and the vane means 25 of the second-mentioned embodiment insure a substantially constant pressure gradient and prevent this previously encountered objectionable action.

Although I have particularly referred to some of the novel features of the invention involved, it will be apparent to those skilled in the art that there are many other features of novelty and that suitable modifications, adaptations, omissions, and additions can be made without departing from the spirit and scope of my invention as set forth in the appended claims.

I claim:

1. The method of contacting a variable load of water and steam wherein the water and steam substantially increase and decrease in volume together which comprises flowing the water by gravity over a steam outlet orifice and utilizing the change in volume of the water to change the direction of flow of the water relatively to the steam in such manner that at low rates of flow the water tends to block the orifice and at higher rates of flow the water flows in a path nearly coincident with the direction of flow of the steam from the orifice.

2. The method of contacting a variable load of water and steam wherein the volume of water and steam increases and decreases substantially together, which comprises discharging steam from an outlet channel, flowing the water by gravity across the channel whereby at low volume of flow the water tends to flood the channel and the steam gurgitates through it and at high rates of flow the steam and water are sprayed into space together.

JOHN R. McDERMET.